May 7, 1968  F. M. NASH  3,381,823

HIGH FLOW SAND GRAVEL TYPE FILTER

Filed Oct. 13, 1965  3 Sheets-Sheet 1

INVENTOR.
FLOYD M. NASH
BY
WARREN, BROSLER, CYPHER & ANGLIM
ATTORNEYS

INVENTOR.
FLOYD M. NASH
BY
WARREN, BROSLER, CYPHER & ANGLIM
ATTORNEYS

INVENTOR.
FLOYD M. NASH
BY
WARREN, BROSLER, CYPHER & ANGLIM
ATTORNEYS 3,381,823
HIGH FLOW SAND GRAVEL TYPE FILTER
Floyd M. Nash, Little Rock, Ark., assignor to Jacuzzi
Bros., Incorporated, a corporation of California
Filed Oct. 13, 1965, Ser. No. 495,517
15 Claims. (Cl. 210—279)

ABSTRACT OF THE DISCLOSURE

A high flow sand and gravel type filter, involving an underdrain of bonded anthracite aggregate, a pressure free grid exposed above the filter medium, and means providing inflow and discharge of liquid symmetrically with respect to both the underdrain and grid.

My invention relates to filters and more particularly filters of the sand and gravel type, commonly employed in connection with swimming pool installations, though not limited in its application thereto.

In building up the filter bed of a conventional type sand and gravel filter, sand of a fine grade is relied on for filtering, such sand being supported on an underdrain formed of a plurality of layers of gravel of differing grade size, to permit ready flow of the filtered liquid to an outlet in the filter tank. Not only does such multi-layer support for the filter sand require considerable space, in addition to the labor required in establishing such layers prior to the addition of the filter sand, but in recharging a filter, the same procedures must be repeated.

Further, such conventional type sand and gravel filters have been limited in their flow rates. Even those considered as high flow filters have a flow rate limited to approximately 5 gallons per square foot of filter area, because of unsatisfactory filtration at high flow rates. This I attribute to shifting of the sand in response to the eddy and circulatory currents created at high flow rates, and such shifting of the sand, in turn preventing establishment of an adequate filter bed on top of the filter medium.

The efficiency of a filter further, depends largely on the effectiveness of the backwash operation in removing accumulated sediment from the filter medium. The ability to effectively accomplish such cleaning, is hindered to a great extent, by the many layers of coarse gravel of diminishing size, which constitute the underdrain of the conventional type filter.

Among the objects of my invention are:

(1) To provide a novel and improved filter assembly of the type utilizing sand or the like as a filter medium;

(2) To provide a novel and improved filter assembly of the above type, capable of functioning at considerably increased efficiency, of the order of 300 to 400 percent of that of the conventional type of comparable size;

(3) To provide a novel and improved filter assembly of the above type, capable of greater output than a conventional type sand and gravel filter of larger size;

(4) To provide a novel and improved filter assembly of the above type, which enables a cleaner backwash operation than one of conventional type;

(5) To provide a novel and improved filter assembly of the above type, in which the charging thereof involves substantially less labor than a comparable filter assembly of the conventional sand and gravel type;

(6) To provide a novel and improved filter assembly of relatively small compact size, but capable of handling the load of a larger filter assembly of conventional design; and (7) To provide a novel and improved underdrain for a filter assembly of the type utilizing sand or the like as a filter medium.

Additional objects of my invention will be brought out in the following description of preferred embodiments of the same, taken in conjunction with the accompanying drawings, wherein.

Figure 1:
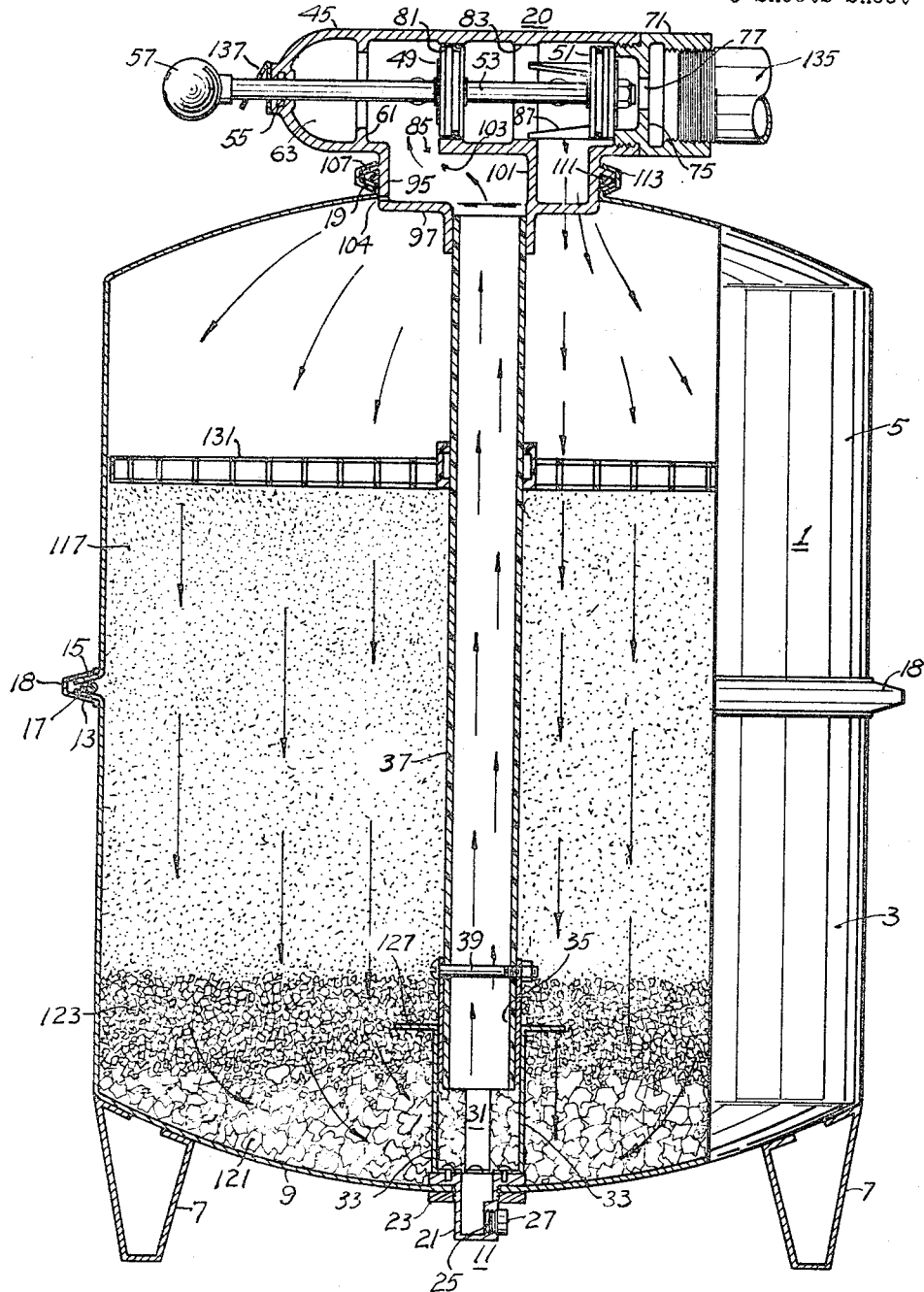
FIGURE 1 is a view in section through a filter assembly of the present invention, showing the same adjusted for normal filter operation.

Referring to the drawings for details of my invention in its preferred form, the same involves a tank 1 comprising the lower section 3 and an upper section 5, basically similar to the lower section but reversed with respect thereto.

The lower tank section is provided with spaced legs 7, while the bottom 9 of the section has a center opening to permit of the installation of a drain fitting assembly 11. The upper edge of this tank section is flared outwardly to form an upwardly directed rim flange 13.

The upper reversed half of the tank is likewise outwardly flared to form a similar rim flange 15 matching that of the lower tank section, and opposing the same, with an O-ring seal 17 gripped between the two flanges and maintained so, by a clamping band 18 encircling the tank and enclosing the abutting flanges.

The bottom of this upper tank section, which now constitutes the top of the tank, has a large central opening bordered by an angle flange 19 to provide a support and means of attachment for a 4-way valve assembly 20, employed in controlling direction of flow of water through the filter portion of the filter assembly.

The drain fitting assembly is made up of a hollow flanged fitting 21 extending through the bottom opening of the tank from within, the exposed portion being threaded to receive a clamping nut 23, with suitable sealing washers disposed on either side of the tank bottom between the fitting flange and the locking nut to assure sealing.

A lateral opening 25 through the wall of the exposed portion of the hollow fitting permits drainage of liquid from the tank interior, but such opening is normally closed during filtering operations, by a drain plug 27.

At the bottom of the tank in flow communication with the discharge or drain opening, is a cage 31 formed by a plurality of vertically disposed metal strips 33 anchored to the flange of the drain fitting.

The upper ends of these strips carry a cylinder or sleeve 35 into which slidably fits the lower end of a central tube 37, which may be of plastic, such tube extending upwardly to a point centrally of the opening at the upper end of the tank. The tube is supported in this position by a bolt 39 extending diametrically through the sleeve 35 and the tube.

The 4-way valve assembly depicted involves a housing 45, partly in the form of a generally cylindrical casting for housing a multiple valve, comprising a pair of spaced pistol type valves 49, 51 on a valve stem 53 extending through a gland 55 at one end of the housing, and terminating in a handle 57.

A valve seat 61 spaced from the handle end of the housing is adapted to be engaged by the approximate valve 49 when the handle is moved in the direction away from the housing, and when so engaged, the proximate valve defines a chamber 63 with the handle end portion of the housing, which chamber is flow connectable to the outside by an integrally formed pipe connection outlet 67, which, in a swimming pool installation, will be connected to the pool inlet.

At the opposite end of the housing, the housing is internally threaded to receive a fitting 71 providing an inwardly facing valve seat 73 for engagement by the other valve 51 when the handle is moved inwardly toward the housing.

Externally of the housing, the fitting is internally threaded to permit of a pipe connection thereto, while an intermediate partition 75 in the fitting, has a reduced opening 77 therein to limit flow from this end of the valve assembly. In a pool installation, this end of the valve assembly will be connected for discharge of waste.

Intermediate the two referred to valve seats, the housing is provided with a pipe connection outlet 79 similar to the pool connection outlet 67. Interiorly of the housing, to either side, of the outlet 79, is a valve seat 81 and 83 respectively, adjacent each of which is an opening 85 and 87 respectively in the cylindrical wall of the housing.

Extending downward from these openings are a pair of concentric flow passageways, and with said openings being to either side of the pump connection outlet 79, water entering the valve assembly from a pump, will flow out through one or the other of these passageways depending on the positional adjustment of the 4-way valve assembly.

The two downwardly extending flow passageways are formed by the housing casting, such being accomplished by casting the housing with a downwardly extending cylindrical wall 95 spanned by a floor 97, the floor having one or more arcuate openings 99 therethrough, to place the pump connecting outlet in flow communication with the interior of the tank by way of the opening 87 in the cylindrical wall of the housing adjacent the valve seat 83.

Centrally of the floor 97, and formed by an integrally cast cylindrical wall 101 provided with an opening 103 interiorly of the housing, is a second flow passageway into and out of the valve housing by way of the opening 85 in the cylindrical wall of the housing adjacent the other valve seat 81, with a vent 104 included.

The isolated passageway forming wall 101 extends somewhat below the floor of the valve housing to receive the upper end of the tank tube 37, while the cylindrical wall 95 snugly fits into the opening in the upper end of the tank.

To seal this valve assembly to the tank, the cylindrical wall 95 of the valve housing is cast with a downwardly directed flange 107, adapted to match that of the tank, to provide for the housing of an O-ring 111 which is clamped between the two flanges by a clamping band 113 of stainless steel or other suitable material.

In the bottom of the tank, is an underdrain for supporting a filter medium 117, which in the preferred embodiment, will be sand. The underdrain may be of a single layer of aggregate, but is preferably formed of two or more layers 121, 123 . . . etc., of aggregate of differing coarseness, each layer being of a finer grade than the layer immediately below, and with the uppermost layer 121 coarser than the filter medium 117.

The elements of the aggregate are bonded together by any suitable bonding agent, the bonding agent being restricted to the surfaces of the elements, to maintain the natural voids normally formed throughout the aggregate, due to the irregular shape of the elements.

In the preferred embodiment of the invention illustrated, the underdrain is formed in situ, layer by layer, and this is accomplished prior to installing the tank tube and assembling the tank itself. The coarse aggregate to form the bottom layer, is first coated with the bonding agent and then poured into the lower tank section, where it is permitted to set, in the course of which, the elements will become bonded to one another, and those in contact with wall surfaces of the tank will bond themselves thereto, thus anchoring the layer.

The next layer, as well as subsequent layers if used, may be similarly bonded in the tank, it being apparent that in the course of preparing the underdrain in the manner indicated, the various layers might well become bonded to one another.

In forming the layers of the underdrain in the tank, the interior of the cage 31 is protected against access to aggregate by first temporarily inserting a tube into the cage to block the various access openings therein, thus assuring that when the aggregate is poured into the tank bottom, none of the same can spill into the cage.

In order to more securely anchor the underdrain within the tank and thus offer greater assurance of adequate anchorage of the same within the tank during shipment or rough handling, each of the strips 33 forming the cage is preferably bent at its upper end to a right angle, to form an anchoring tab 127 which, during the forming of the underdrain, will become solidly embedded within the upper layer thereof.

Supported at the surface of the filter medium is a stabilizing grid 131, the function of which is to stabilize the surface of filter medium against shifting, even at high flow rate of water through the filter.

When installed in a swimming pool system for which it is designed, the pool will be connected to the pipe connection 67 located at the handle end of the valve assembly, while the pump will be connected to the pipe connection 79 located in the mid portion of the valve assembly, while a waste discharge pipe 135 will be connected to the valve seat fitting 71 at the end of the valve housing. For normal filtering operation, the valve handle will be pushed in toward the valve housing, thus setting the multiple valve in the position indicated in FIGURE 1 of the drawings. A lock 137 serves to retain the handle in this position.

Figure 2:
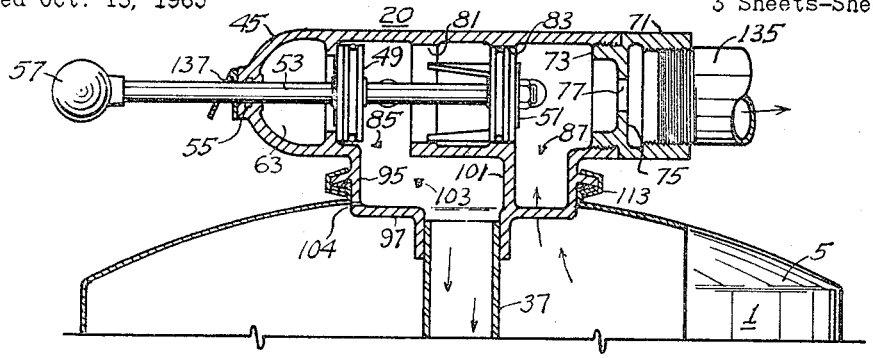
FIGURE 2 is a fragmentary view of the assembly of FIGURE 1, depicting the same adjusted for a backwash operation.
Figure 3:
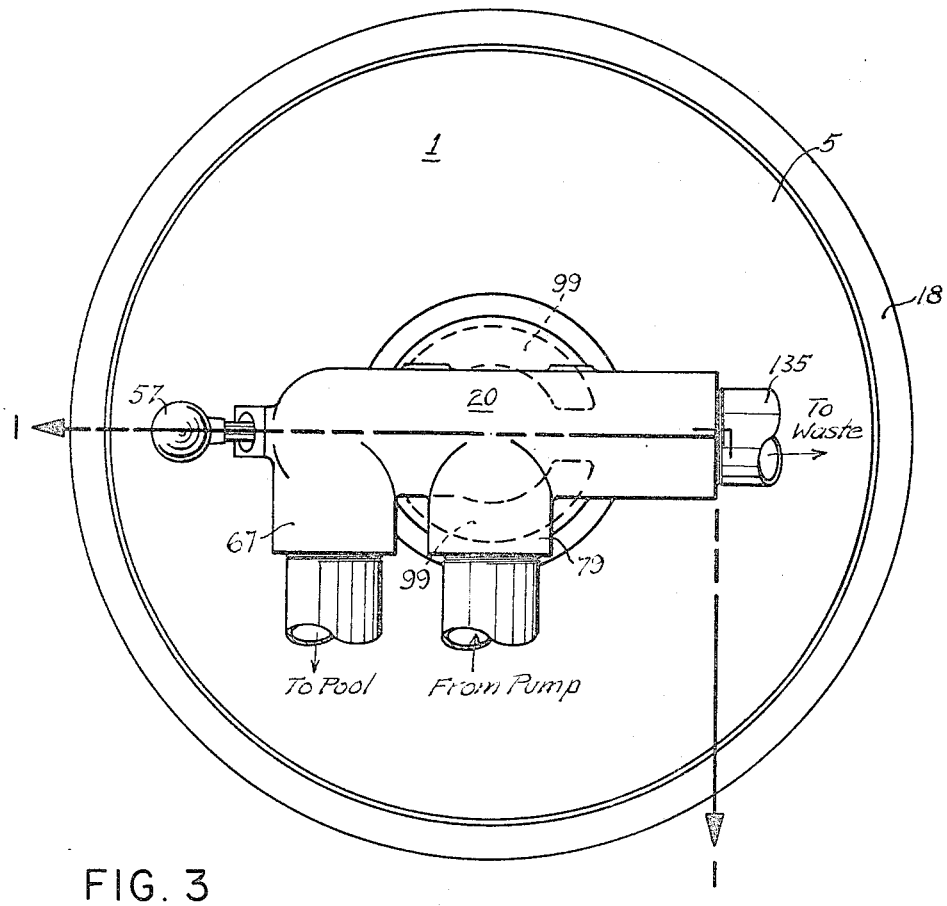
FIGURE 3 is a plan view of the filter assembly of the preceding views.

In such position, water entering the suction end of the pump from the drain end of the pool will be pumped into the filter tank, where it will flow through the filter medium and the underdrain, and out of the tank by way of the tank tube, and back to the swimming pool as filtered water. When the condition of the filter assembly indicates the need for a cleaning, the valve handle, while holding the lock in its released condition, will be pulled outward to set the valves in the positions depicted in FIGURE 2, whereby the flow to the pool will be blocked off, and the pump will now pump through the filter assembly in reverse, to bring about a backwash operation. Under these conditions, the discharge from the tank will pass out through the reduced opening 77 in the valve seat fitting and through the pipe 135 to waste.

As a phenomena accompanying such backwash operation, the filter medium will expand, thus increasing the porosity of the filter medium and permitting the trapped sediment to more readily escape and be carried off to waste. Excessive agitation and turbulence is avoided by the reduced opening 77 through which the water must be discharged.

To accommodate such expansion, the stabilizing grid is slidably supported about the tank tube, and is fabricated of a material having a specific gravity just slightly above that of water. When so fabricated and installed, the grid will readily move upward with expansion of the filter medium, and will settle with the filter medium when the backwash operation is brought to a halt. The sliding fit of the grid about the tank tube will discourage any tilting of the grid during any portion of the filter cycle. This is desirable toward maintaining proper functioning of the grid.

The bonding of most any aggregate to form an underdrain, broadly offers the advantages noted, but improved results have been realized when the aggregate employed is anthracite coal, and the bonding agent is an epoxy resin, for anthracite coal, when broken up, results in elements of non-uniform shape and possessing surfaces which are exceedingly smooth and hard, to which dirt and sediment would find it quite difficult to adhere. The epoxy resin when employed as a bonding agent, also exhibits similar characteristics in presenting a smooth inert surface which does not tend to become encrusted with lime and other deposits. Thus an underdrain formed in the manner indicated, if it contains any sediment or foreign matter, will wash exceedingly clean during a backwash operation, and never need be replaced during the life of the filter assembly.

In assembling the filter unit, the underdrain, as previously described, is formed in situ, in the lower half of the filter tank, prior to assembling such tank. The tank is assembled for shipment without the filter medium, but after the grid is installed about the tank tube.

At the time of installation, the tank may be disassembled, and the lower half filled with sand or equivalent filter medium, following which, the tank will be reassembled and the balance of required filter medium added through the top before the valve assembly is replaced.

While at this stage of the installation, the grid will be buried, it will be recalled that its specific gravity is but slightly greater than that of water. Therefore, its specific gravity will be less than sand, the conventional filter medium employed. During a backwash operation, therefor, the grid will move to the upper end of the tank, and upon halting of such operation, the grid will settle back more slowly than the sand and will ultimately establish itself in its proper functional position upon the surface of the filter medium.

While the underdrain has been described as being formed within the tank, it is contemplated that the underdrain can be fabricated in advance as a separate article of manufacture, for subsequent installation into a filter tank, and when so fabricated and installed, it can then be bonded to the walls of the tank, if desired, or suitable mechanical means may be employed to hold the prefabricated underdrain in its functioning position with the tank.

It is noted that while the filter assembly of the present invention is of the sand and gravel type, no gravel is employed. Consequently, aside from the many advantages already attributed to the present invention, the preparation and use of a bonded underdrain as described, eliminates the many problems and inconveniences encountered in the conventional sand and gravel type filter, where the underdrain comprises a plurality of layers of gravel of differing grades, which are added at the time of installation of the filter assembly in a pool system. In the filter assembly of the present invention, only the sand need be added. Thus installation becomes a simplified procedure.

Although, in the embodiment illustrated and described, the underdrain comprises but two layers, and additional layer or layers of aggregate may be employed, it has been found that the use of a bonded underdrain as described, will permit of the use of less layers and less volume than that required by the conventional type underdrain formed of several layers of different grades of gravel, with the result that the filter assembly of the present invention can be considerably shorter because of the less space required to support the filter medium, and the diameter can be greatly reduced due to the high filtration rate obtainable.

For some idea as to the increase in filtration rate obtainable with the filter assembly of the present invention, it might be pointed out that what have heretofore been considered rapid sand and gravel type filters have been limited to flow rates of approximately 5 gallons per minute per square foot of filter area, whereas in a filter assembly embodying the present invention and utilizing the bonded underdrain and the stabilizing grid, it is possible to obtain satisfactory filtration at flow rates of 15 to 20 gallons per minute per square foot of filter area, thus increasing the filtration flow rate 3 to 4 fold, or in other words, 300 to 400 percent.

Figure 4:
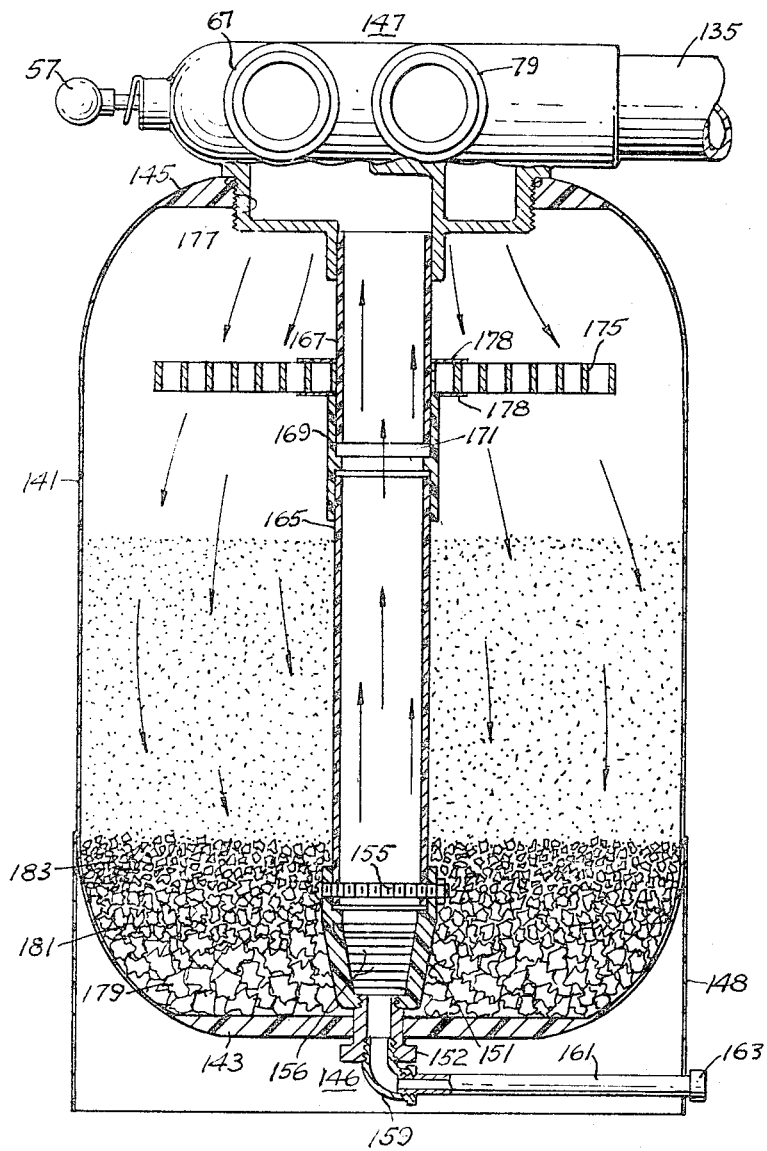
FIGURE 4 is a view in section through a modified form of the invention.

The embodiment of the invention illustrated in FIGURE 4, has been designed from the viewpoint of utilizing to a large degree, material such as plastic in the fabrication thereof.

The tank 141 is of plastic, cylindrical in shape and having substantially hemispherical ends 143, 145 of increased thickness at the extremities thereof, to provide for the installation of a drain assembly 146 at the lower end of the tank and a valve assembly 147 at the upper end. The tank is supported by a skirt 148 encircling the same and bonded thereto.

The cage 151 in this particular embodiment, is of inverted frusto-conical form with a threaded opening at its lower end for anchoring the same by a nut drain 152 extending up through the bottom end of the tank and threadedly secured to the cage. The upper end of the cage is counterbored to receive the lower end of a central tube 153 which is anchored in the counter-bored end of the cage by a cross bolt 155 in much the same manner as in the first embodiment of the invention described.

A plurality of narrow slot openings 156 in the walls of the cage permit of the necessary flow of liquid, but are preferably sufficiently narrow to preclude entrance of any of the aggregate during formation of the underdrain. The structure of the cage as thus descended, length itself to molding of plastic, and fabrication thereof from such material is preferred.

An elbow fitting 159 threaded into the lower end of the nut drain provides for attachment of a drain tube 161, leading to the outside of the skirt and supported therein at its discharge end. A cap 163 on the exposed end of the drain tube, will serve to hold back flow until such flow is desired.

The central tube which, like in the first embodiment, is of plastic material, is in this instance comprised of a lower section 165 and an upper section 167 supported and maintained in alignment by a coupling sleeve 169 provided with an intermediate limiting flange 171 which substantially maintains the relationship between the central tube sections, as well as the location of the coupling sleeve with respect thereto. The relative lengths of the tube sections are such as to locate the coupling sleeve above the surface of the filter medium, and the upper edge of the coupling sleeve is utilized as a support for a grid 175.

Like the embodiment of FIGURE 1, the upper end of the tank is provided with an enlarged opening 177 for the installation of the valve assembly 147 which, like the valve assembly 21 of FIGURE 1, has a central flow passageway adapted to fit over the upper end of the central tube in the manner of the embodiment of FIGURE 1.

Since the end wall section of the tank in this region is of substantial thickness, the opening 177 therethrough may be threaded, and the valve assembly correspondingly formed to permit of the threading thereof to the upper end of the tank, in lieu of the use of flanges and a clamping band as illustrated and described in connection with the embodiment of FIGURE 1.

In the embodiment of FIGURE 4 as described, the grid 175 will be fabricated or molded of soft very flexible rubber or like material, whereby the same, though larger than the valve assembly opening 177, may be installed through such opening prior to the installation of the valve assembly. Stabilizing washers 178 may be utilized to stabilize the grid in position on the tube.

While in the embodiment of FIGURE 1 only two layers of aggregate make up the underdrain as illustrated, three layers, 179, 181, 183 for illustrative purposes only, have been depicted in the embodiment of FIGURE 4, it being appreciated that the number of such layers in either case may be altered to suit conditions.

From the foregoing description of my invention, it will be appreciated that the same fulfills all the objects attributed thereto, and while I have illustrated and described the same in considerable detail, it will be apparent that the same is subject to alteration and modification without departing from the underlying principles involved, and I accordingly do not desire to be limited in my protection to the specific details so illustrated and described, except as may be necessitated by the appended claims.

I claim.

1. A filter assembly comprising
a tank,
a filter medium in said tank, said filter medium comprising individual particles such as sand and the like,
means for stabilizing such particles against shift, and encouraging uniform flow of liquid through said filter medium,
an underdrain for the filter medium, comprising a coarse aggregate and means bonding said coarse aggregate into a unitized layer and leaving voids between the elements thereof,
a flow passageway along the central axis of said tank, from said layer of coarse aggregate to the upper end of said tank for discharge of filtered liquid,
means for symmetrically distributing to said filter medium with respect to said central flow passageway, liquid to be filtered,
and means for reversing liquid flow through said filter for backwashing said filter, whereby said centrally located flow passageway will enable the layer of coarse aggregate to perform the function of a liquid distribution header exclusively.

2. A filter assembly comprising
a tank,
a filter medium in said tank, said filter medium comprising individual particles such as sand and the like,
means for stabilizing such particles against shift, and encouraging uniform flow of liquid through said filter medium,
an underdrain for the filter medium, comprising a coarse aggregate and means bonding said coarse aggregate into a unitized layer and leaving voids between the elements thereof,
a finer aggregate, and
means bonding said finer aggregate into a unitized layer, and leaving voids between the elements thereof,
said layer of finer aggregate being disposed above said layer of coarse aggregate,
a flow passageway along the central axis of said tank from said layer of coarse aggregate to the upper end of said tank for discharge of filtered liquid,
means for symmetrically distributing to said filter medium with respect to said central flow passageway, liquid to be filtered,
and means for reversing liquid flow through said filter for backwashing said filter, whereby said centrally located flow passageway will enable the layer of coarse aggregate to perform the function of a liquid distribution header exclusively.

3. A filter assembly comprising
a tank,
a filter medium in said tank, said filter medium comprising individual particles such as sand and the like,
means for stabilizing such particles against shift, and encouraging uniform flow of liquid through said filter medium, said means including a pressure free grid unsecured to said tank and exposed above the surface of said filter medium,
and an underdrain for the filter medium, comprising a coarse aggregate and means bonding said coarse aggregate into a unitized layer and leaving voids between the elements thereof.

4. A filter assembly comprising
a tank,
a filter medium in said tank, said filter medium comprising individual particles such as sand and the like,
means for stabilizing such particles against shift, and encouraging flow of liquid through said filter medium, said means including a pressure free grid unsecured to said tank and exposed above the surface of said filter medium,
means for restraining said grid against tilting while permitting movement thereof longitudinally of said tank to accommodate expansion of the filter medium during a backwash operation,
and an underdrain for the filter medium, comprising a coarse aggregate and means bonding said coarse aggregate into a unitized layer and leaving voids between the elements thereof.

5. A filter assembly comprising
a tank,
a filter medium in said tank, said filter medium comprising individual particles such as sand and the like,
means for stabilizing such particles against shift, and encouraging uniform flow of liquid through said filter medium, said means including a pressure free grid unsecured to said tank and exposed above the surface of said filter medium,
means for restraining said grid against tilting while permitting movement thereof longitudinally of said tank to accommodate expansion of the filter medium during a backwash operation,
and an underdrain for the filter medium, comprising a coarse aggregate, means bonding said coarse aggregate into a unitized layer and leaving voids between the elements thereof,
a finer aggregate, and
means bonding said finer aggregate into a unitized layer, and leaving voids between the elements thereof,
said layer of the finer aggregate being disposed above said layer of coarse aggregate.

6. A filter assembly comprising
a tank,
a filter medium in said tank, said filter medium comprising individual particles such as sand and the like,
means for stabilizing such particles against shift, and encouraging uniform flow of liquid through said filter medium, said means including a pressure free grid unsecured to said tank and supported exposed above the surface of said filter medium,
means for restraining said grid against tilting while permitting movement thereof longitudinally of said tank to accommodate expansion of the filter medium during a backwash operation,
and an underdrain for the filter medium, comprising a coarse aggregate and means bonding said coarse aggregate into a unitized layer and to said tank, and leaving voids between the elements thereof,
a finer aggregate,
means bonding said finer aggregate into a unitized layer and to said tank, and leaving voids between the elements thereof,
said layer of finer aggregate being disposed above said layer of coarse aggregate.

7. A filter assembly comprising
a tank,
a filter medium in said tank, said filter medium comprising individual particles such as sand and the like,
means for stabilizing such particles against shift, and encouraging uniform flow of liquid through said filter medium, said means including a pressure free grid unsecured to said tank and supported exposed above the surface of said filter medium,
means for restraining said grid against tilting while permitting movement longitudinally of said tank to accommodate expansion of the filter medium during a backwash operation,
and an underdrain for the filter medium, comprising a coarse aggregate of anthracite coal, means bonding said coarse aggregate into a unitized layer and leaving voids between the elements thereof, said bonding means comprising an epoxy, a finer aggregate of anthracite coal, means bonding said finer aggregate into a unitized layer, and leaving voids between the elements thereof, said bonding means comprising an epoxy, said layer of finer aggregate being disposed above said layer of coarse aggregate.

8. In a filter assembly of the type utilizing sand or the like as a filter medium, an underdrain for the filter medium, comprising a coarse aggregate, means bonding said coarse aggregate into a unitized layer and leaving voids between the elements thereof, and a flow passageway running along the longitudinal axis of said filter assembly and terminating at one end, centrally of said layer of coarse aggregate.

9. In a filter assembly of the type utilizing sand or the like as a filter medium, an underdrain for the filter medium, comprising a coarse aggregate of anthracite coal, means bonding said anthracite coal into a unitized layer and leaving voids between the elements thereof, a finer aggregate than said first aggregate, means bonding said finer aggregate into a unitized layer, and leaving voids between the elements thereof, said layer of finer aggregate being disposed above said layer of coarse aggregate, and a flow passageway running along the longitudinal axis of said filter assembly, through said layer of finer aggregate, and terminating centrally of said layer of bonded anthracite coal.

10. In a filter assembly of the type utilizing sand or the like as a filter medium, an underdrain for the filter medium, comprising a coarse aggregate of anthracite coal, means bonding said coarse aggregate into a unitized layer and leaving voids between the elements thereof, said bonding means comprising an epoxy, a finer aggregate of anthracite coal, means bonding said finer aggregate into a unitized layer, and leaving voids between the elements thereof, said bonding means comprising an epoxy, said layer of finer aggregate being disposed above said layer of coarse aggregate.

11. A filter assembly comprising a tank, a filter medium in said tank, said filter medium comprising individual particles such as sand or the like, means for stabilizing such particles against shift, and encouraging uniform flow of liquid through said filter medium, said means including a pressure free grid unsecured to said tank and supported exposed above the surface of said filter medium, and means for symmetrically directing towards said grid, liquid to be filtered.

12. A filter assembly comprising a tank, a filter medium in said tank, said filter medium comprising individual particles such as sand and the like, and means for stabilizing such particles against shift and encouraging uniform flow of liquid through said filter medium, said means including a pressure free grid unsecured to said tank and supported exposed above the surface of said filter medium, and means for restraining said grid against tilting while permitting movement longitudinally of said tank to accommodate expansion of the filter medium during a backwash operation.

13. An underdrain for use in a filter tank to support a filter medium such as sand or the like, comprising:

a mass of anthracite coal of coarser grade than said filter medium, and means binding said coal into a unitized layer while leaving voids between the elements thereof, said binding means being an epoxy.

14. An underdrain for use in a filter tank to support a filter medium such as sand or the like, comprising:

a mass of anthracite coal of coarser grade than said filter medium, and means binding said coal into a unitized layer while leaving voids between the elements thereof.

15. An underdrain for use in a filter tank to support a filter medium such as sand or the like, comprising:

a mass of anthracite coal aggregate of coarser grade than said filter medium, and means binding said aggregate into a unitized layer while leaving voids between the elements thereof, said binding means being an epoxy, and said unitized layer being of a size capable of fitting into such tank in supporting relationship to such filter medium.

References Cited

UNITED STATES PATENTS

| | | | |
|---|---|---|---|
| 347,203 | 8/1886 | Scott | 210—290 X |
| 862,156 | 8/1907 | Hartsough | 210—289 X |
| 2,072,393 | 3/1937 | Briggs | 210—350 X |
| 2,681,147 | 6/1954 | Braswell | 210—288 X |
| 2,855,364 | 10/1958 | Roberts | 210—274 X |
| 3,011,643 | 12/1961 | McCoy | 210—189 X |
| 3,202,286 | 8/1965 | Smit | 210—290 X |

SAMIH N. ZAHARNA, *Primary Examiner.*